(12) United States Patent
Leutwyler et al.

(10) Patent No.: US 7,798,172 B2
(45) Date of Patent: Sep. 21, 2010

(54) INTERNAL HOUSING FOR A SANITARY FITTING AND SANITARY FITTING

(75) Inventors: Andre Leutwyler, Menziken (CH); Herbert Gloor, Unterkulm (CH)

(73) Assignee: KWC AG, Unterkulm (CH)

( * ) Notice: Subject to any disclaimer, the term of this patent is extended or adjusted under 35 U.S.C. 154(b) by 746 days.

(21) Appl. No.: 11/797,065

(22) Filed: Apr. 30, 2007

(65) Prior Publication Data

US 2007/0256744 A1 Nov. 8, 2007

(30) Foreign Application Priority Data

May 3, 2006 (EP) .................................. 06009110

(51) Int. Cl.
*F16K 11/06* (2006.01)

(52) U.S. Cl. .................. 137/625.41; 137/801

(58) Field of Classification Search ............. 137/454.6, 137/615, 625.17, 625.4, 625.41, 801; 4/677
See application file for complete search history.

(56) References Cited

U.S. PATENT DOCUMENTS

| | | | | |
|---|---|---|---|---|
| 4,921,016 A | * | 5/1990 | Gnauert et al. | ......... 137/625.17 |
| 6,202,693 B1 | * | 3/2001 | Bollo | ..................... 137/625.17 |
| 6,311,729 B1 | * | 11/2001 | Cox et al. | ................... 137/801 |
| 6,571,826 B2 | * | 6/2003 | Ko | ........................ 137/625.17 |
| 2002/0185823 A1 | | 12/2002 | Graber | |
| 2003/0168100 A1 | | 9/2003 | Ericsson | |
| 2005/0076963 A1 | | 4/2005 | Gaenzle | |

FOREIGN PATENT DOCUMENTS

| | | |
|---|---|---|
| CA | 2160119 A1 | 10/1994 |
| DE | 38 41 026 A1 | 6/1990 |
| DE | 41 24 339 A1 | 1/1992 |
| DE | 197 56 971 A1 | 6/1999 |
| DE | 199 30 623 A1 | 1/2001 |
| EP | 1 028 279 A2 | 8/2000 |
| EP | 1 136 629 B1 | 9/2001 |

* cited by examiner

*Primary Examiner*—John Fox
(74) *Attorney, Agent, or Firm*—Oliff & Berridge, PLC

(57) ABSTRACT

An internal housing for a sanitary fitting has a receiving opening for receiving a control cartridge. The receiving opening is bounded along its circumference by a wall and at its lower end by a base. In order to supply water to the control cartridge, the internal housing has an inlet opening passing through the base. A discharge opening for the discharge of the water flowing out from the control cartridge also passes through the base. In order to ensure a leak-tight transition between the internal housing and the control cartridge, an inlet seal groove open on its upper side and completely surrounding the inlet opening, and a discharge seal groove open on its upper side and completely surrounding the discharge opening are formed in the base. The inlet seal groove is for receiving an inlet seal element and the discharge seal groove is for receiving a discharge seal element that consequently bear against the internal housing and against the control cartridge.

13 Claims, 3 Drawing Sheets

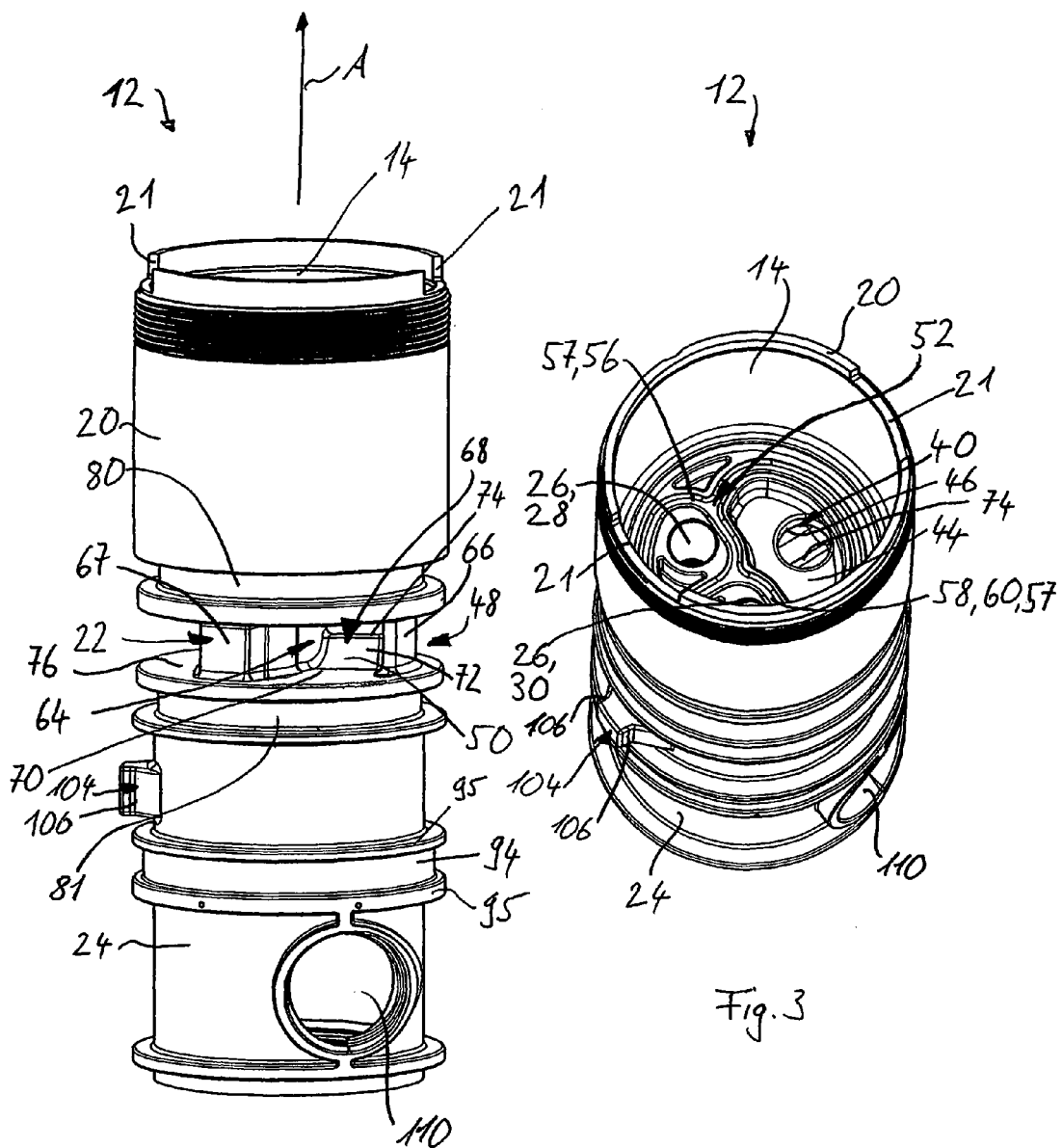

INTERNAL HOUSING FOR A SANITARY FITTING AND SANITARY FITTING

CROSS-REFERENCE TO RELATED APPLICATION

This application claims priority from European Patent Application No. EP 06 009 110.5, filed May 3, 2006, the entire disclosure of which is incorporated herein by reference thereto.

BACKGROUND

The present invention relates to an internal housing and a sanitary fitting for use with an internal housing.

An internal housing of this kind intended for a sanitary fitting and a sanitary fitting with such an internal housing are known, for example, from US-A-2003/0168100. This publication discloses a sleeve-shaped internal housing made from plastic and intended to receive a control cartridge for setting the water discharge rate from the sanitary fitting. Furthermore, if the control cartridge has separate water inlet lines for hot and cold water, it is also possible to set a mixed temperature of the water flowing out from the sanitary fitting. The known internal housing has a lateral discharge opening through which the water flowing out from a discharge orifice of the control cartridge is guided.

SUMMARY

A disadvantage of the prior art is that the known internal housing offers no possibility of delivering water to an inlet orifice of the control cartridge and of discharging the water from the discharge orifice of the control cartridge in a simple manner.

The object of the present invention is to provide an internal housing that permits the permanently leak-tight delivery of water to an inlet orifice and the permanently leak-tight discharge from the discharge orifice of the control cartridge in a simple manner.

This object is achieved by an internal housing for a sanitary fitting with a receiving opening open on its upper side and intended to receive for receiving a control cartridge comprising an inlet orifice and a discharge orifice, the receiving opening being bounded along its circumference by a wall, and with a discharge opening for discharging water from the discharge orifice, wherein the receiving opening is bounded at its lower end by a base formed in one piece with the wall, with an inlet opening for supplying water to the inlet orifice, the discharge opening, an inlet seal groove open on its upper side for receiving an inlet seal element and completely surrounding the inlet opening, and a discharge seal groove open on its upper side for receiving a discharge seal element and completely surrounding the discharge opening being formed in the base and with a sanitary fitting with an external housing and an internal housing inserted therein, wherein the control cartridge is inserted into the receiving opening, the inlet seal element and the discharge seal element respectively engage in the inlet seal groove and in the discharge seal groove and the external housing has a water discharge channel that has a flow connection to the discharge opening.

According to the invention the internal housing has a base through which an inlet opening and a discharge opening pass, wherein water can be delivered to an inlet orifice of the control cartridge via the inlet opening and the water discharged from a discharge orifice of the control cartridge can be discharged via the discharge opening. Furthermore, an inlet seal groove completely surrounding the inlet opening and a discharge seal groove completely surrounding the discharge opening are formed in the base.

In order to ensure a leak-tight transition between the inlet opening and the inlet orifice, an inlet seal element can be placed as a seal into the inlet seal groove that also seals tightly around the inlet orifice against the control cartridge and engages in a groove formed in the control cartridge. This allows for a permanently leak-tight transition from the water-carrying inlet opening into the control cartridge to be created, as the inlet seal element can be inserted on the one hand into the inlet seal groove and on the other hand into the control cartridge groove formed on the control cartridge. Even in the event of a pressure thrust transmitted by the water that results in a force thrust acting on the inlet seal element in the radial direction, the inlet seal element remains held in the inlet seal groove. Consequently the force thrust acting on the inlet seal element does not result in a shift of the end region of the inlet seal element on the control cartridge side so that the transition from the flow opening into the inlet orifice is permanently leak-tight.

In order to ensure a leak-tight transition between the discharge orifice and the discharge opening, a discharge seal element can be placed as a seal into the discharge seal groove that also seals tightly around the discharge orifice against the control cartridge and engages in a control cartridge groove formed in the control cartridge. This allows for a permanently leak-tight transition from the discharge orifice into the water-bearing discharge opening to be created, as the discharge seal element can be inserted on the one hand into the discharge seal groove and on the other hand into the control cartridge groove formed on the control cartridge. Even in the event of a pressure thrust transmitted by the water that results in a force thrust acting on the discharge seal element in the radial direction, the discharge seal element remains held in the discharge seal groove. Consequently the force thrust acting on the discharge seal element does not result in a shift of the end region of the discharge seal element on the control cartridge side so that the transition from the discharge orifice into the discharge opening is permanently leak-tight.

In accordance with a preferred embodiment of the internal housing, the housing is made of plastic in one piece. This material allows the inlet seal groove and the discharge seal groove to be formed in the base of the receiving opening and the inlet opening and the discharge opening to be passed through the base in a very simple manner. The plastic with the trade name Grivory HT1V-4FWA of Ems-Chemie AG (GRIVORY is a registered trademark of EMS-CHEMIE AG, Domat/Ems, Switzerland) has proved to be suitable for the absorption of large forces.

In accordance with a preferred embodiment, the inlet seal groove is formed to be contiguous with the discharge seal groove, so that the inlet seal element to be placed into this inlet seal groove and the discharge seal element to be placed into the discharge seal groove can be formed together. This simplifies their installation and handling, and a mechanical stability of the inlet seal element and of the discharge seal element is improved.

In accordance with a further preferred embodiment, the inlet opening and the discharge opening conduct the water directly, thus permitting a simple design of the internal housing. Furthermore, the internal housing has a water discharge groove connected to the discharge opening. By means of this water discharge groove it is very simple to direct the water flowing out of the discharge opening and consequently out of the water discharge groove into an outer housing discharge channel of a fitting discharge housing part mounted pivotably on the internal housing.

In accordance with a preferred embodiment, an upper seal receiving recess and a lower seal receiving recess are formed respectively above and below the water discharge groove. The sealing elements with V-shaped cross section that can be placed into the upper seal receiving recess and lower seal receiving recess allow a leak-tight transition to be achieved in a very simple manner between the water discharge groove and the outer housing discharge channel.

In accordance with a preferred embodiment, the internal housing has a deflection element in the discharge opening by means of which water flowing through the discharge opening can be deflected by at least roughly 90°. The water jet is continuously deflected by the deflection surfaces of the deflection element, allowing swirling to be essentially prevented and consequently noises caused by swirling to be avoided.

In accordance with a further preferred embodiment the radial outer surface of the internal housing has an at least roughly circular cylindrical form and a projection extending radially from the outer surface is formed on the internal housing. This projection has stop surfaces in the circumferential direction. This projection formed on the internal housing permits a very simple limitation of the pivoting range of a fitting discharge housing part engaging around the internal housing which part in turn has opposite stop surfaces intended to interact with the stop surfaces of the projection.

Further preferred embodiments of the internal housing according to the invention and preferred embodiments of the sanitary fitting are described in the further claims.

BRIEF DESCRIPTION OF THE DRAWINGS

Further special advantages and methods of operation can be seen from the detailed description and the drawing.

The invention is described in further detail below by reference to an exemplary embodiment illustrated in the drawing, in which, purely diagrammatically.

FIG. 2 shows the internal housing in a perspective side view;

FIG. 3 shows the internal housing in a perspective top view with a receiving opening intended to receive the control cartridge;

DETAILED DESCRIPTION OF EMBODIMENTS

Figure 1:
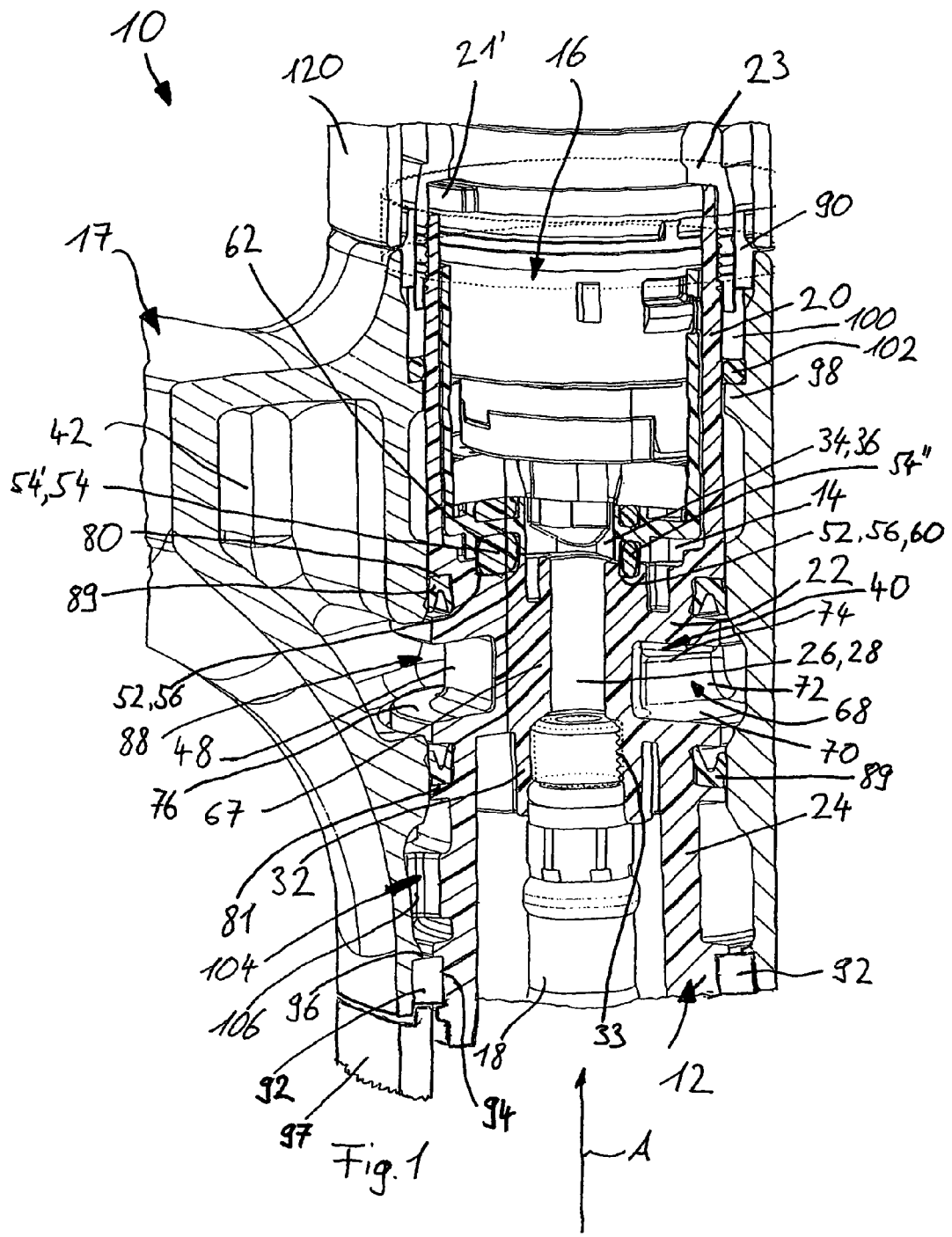
FIG. 1 shows in a perspective side view and partially cut away a sanitary fitting comprising an internal housing with a control cartridge inserted into the internal housing and a fitting discharge housing part mounted pivotably on the internal housing, with the view being taken along two sectional planes at an angle to one another.

FIG. 1 shows a sanitary fitting 10 according to the invention with a partially illustrated internal housing 12 according to the invention. The sanitary fitting 10 is intended to be installed in the known manner in a washstand with a wash basin recessed into the washstand.

The internal housing 12 has a receiving opening 14 that is open at its upper end (see also FIG. 2 to FIG. 5) into which a control cartridge 16 is inserted. A water flow rate from a water discharge opening of the sanitary fitting 10 arranged on a fitting discharge housing part 17 in the known manner can be set by means of the control cartridge 16. Furthermore, the present control cartridge 16 can also be used to set a mixing ratio of hot and cold water and hence the temperature of the water flowing out of the water discharge opening. The cold water is supplied to the sanitary fitting 10 via a cold water supply line 18 and the hot water via a hot water supply line (not illustrated). The cold water supply line 18 and the hot water supply line each form a water supply line to the sanitary fitting 10.

The internal housing 12 shown in FIG. 1 to FIG. 5 has an essentially circular cylindrical contour which defines an axial direction A. The receiving opening 14 is bounded in the circumferential direction by a wall 20 formed by a hollow cylindrical section of the internal housing 12 oriented in axial direction A. The receiving opening 14 is bounded at its lower end by a base 22 that is formed integrally with the wall 20 and is located in axial direction A at roughly half the height of the internal housing 12.

In order to hold the control cartridge 16 in the receiving opening 14 in a defined rotational position about the axial direction A, the wall 20 has a recess open at the upper end and recesses 21 open at the side (see FIG. 2 to FIG. 5) as shown in FIG. 1, into which a projection 21' (see FIG. 1) of the control cartridge 16 engages. The control cartridge 16 is fixed in the receiving opening 14 by means of a cartridge retaining nut 23 designed as a union nut screwed onto the internal housing 12 from above; in particular the control cartridge is pressed in the direction of the base 22 by means of the cartridge retaining nut 23.

The internal housing 12 furthermore has in axial direction A, opposite the wall 20 in relation to the base 22, an also essentially hollow cylindrical sleeve wall 24 oriented in axial direction A. This sleeve wall 24 is also formed integrally with the base 22, so that the wall 20, the base 22 and the sleeve wall 24 are formed in one piece.

A cold water opening 28 forming an inlet opening 26 and a hot water opening 30 also forming an inlet opening 26 pass through the base 22 in axial direction A. The cold water opening 28 and the hot water opening 30 each have in an end region facing away from the receiving opening 14 a connection fitting 32 with an internal thread 33 protruding from the base 22 (see FIG. 1) into which the cold water supply line 18 and the hot water supply line are screwed in a leak-tight fashion.

Cold water can be supplied via the cold water opening 28 to a cold water orifice 36 of the control cartridge 16 that forms an inlet orifice 34. The cold water orifice 36 lies in axial direction A at least roughly in the extension of the cold water opening 28. Correspondingly hot water can be supplied to a hot water orifice that forms an inlet orifice via the hot water opening 30. The hot water orifice lies in axial direction A at least roughly in the extension of the hot water opening 30.

In order to direct the water supplied to the control cartridge 16 to the water discharge opening of the sanitary fitting 10, the internal housing 12 has a discharge opening 40 extending through the base 22 that ends in a circumferentially open water discharge groove 48 formed in the base 22. The water flowing through the water discharge groove 48 when the control cartridge 16 is open is directed into an external housing discharge channel 42 arranged in the fitting discharge housing part 17 at the end of which channel the water discharge opening is arranged.

The discharge opening 40 is formed by several sections. On the control cartridge side the discharge opening 40 has an essentially kidney bowl-shaped recess 44 formed in the base 22, which recess is open in the direction of the control cartridge 16 and from the base of which a tube-like channel section 46 opens in axial direction A downwards into a connecting section 64 formed at right angles to the latter, with the channel section 46 meeting the connecting section 64 more or less in the middle. The latter opens in turn at discharge opening orifices 50 into the water discharge groove 48.

Figures 4, 5:
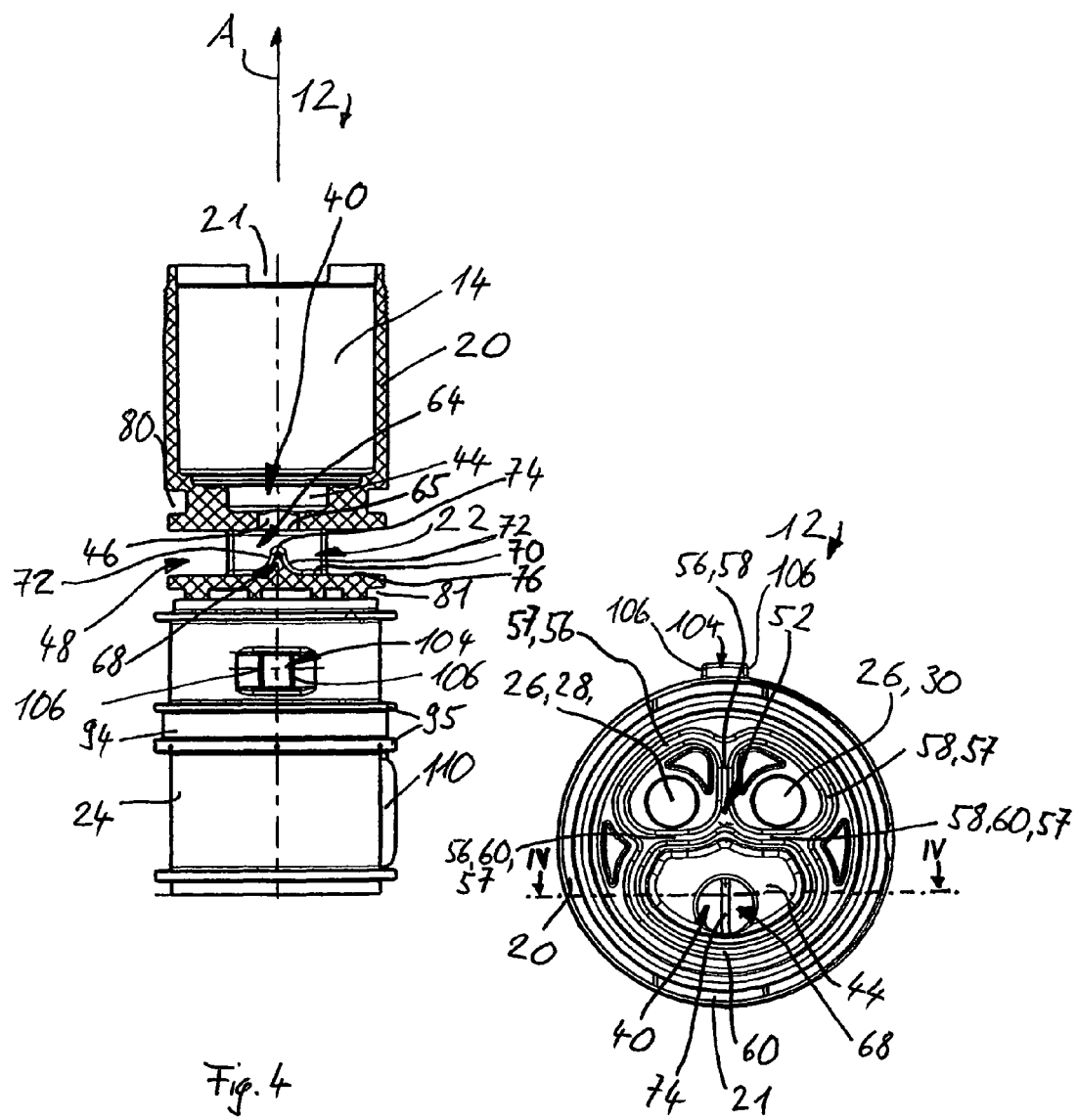
FIG. 4 shows the internal housing in a side view and partially along the sectional line IV-IV shown in FIG. 5.
FIG. 5 shows the internal housing in a top view.

FIGS. 1, 3 and 5 show that a cold water seal groove 56 completely surrounding the cold water opening 28 and at a distance therefrom is formed from above in the base 22. A hot water seal groove 58 completely surrounding the hot water opening 30 is also formed in the base 22, again at a distance from the hot water opening 30. Furthermore a discharge seal groove 60 completely surrounding, and at a distance from, the discharge opening 40 is formed in the base 22. The three grooves—the cold water seal groove 56, the hot water seal groove 58 and the discharge seal groove 60—are formed integrally with one another in sections as a single groove 52 so that only one common groove section is formed in the base 22 between the cold water opening 28 and the hot water opening 30. A common groove section is also formed between the hot water opening 30 and the discharge opening 43, and a common groove section is formed between the discharge opening 40 and the cold water opening 28.

In order to ensure a leak-tight transition between the cold water opening 28 and the cold water orifice 36 of the control cartridge 16, the hot water opening 30 and the hot water orifice and the discharge orifice and the discharge opening 40, a matching seal element 54 is placed into the groove 52 that also engages in a correspondingly formed control cartridge groove 62.

The groove 52 and the seal element 54 have roughly the form of a pretzel (see FIGS. 3 and 5). This form of the groove 52 and of the seal element 54 simplifies the handling of the seal element 54.

In accordance with its function, the seal element 54 forms inlet seal elements 54' and a discharge seal element 54". The inlet seal elements 54' are formed by the sections of the seal element 54 inserted into the inlet seal grooves 57. Correspondingly, the discharge seal element 54" is formed by the section of the seal element 54 inserted into the discharge seal groove 60.

As the seal element 54 engages on the one hand in the groove 52 and on the other hand in the control cartridge groove 62, the seal element 54 is held—with the exception of a gap formed between the base 22 and the control cartridge 16, if at all,—in the radial direction by the groove 52 and by the control cartridge groove 62, so that the seal element 54 cannot be shifted by pressure thrusts transmitted by the water, for example caused by sudden closing of the control cartridge 16. This ensures a permanently leak-tight seating of the seal element 54 between the control cartridge 16 and the base 22.

As an alternative to the integral forming of the cold water seal groove 56, the inlet seal groove 57 and the hot water seal groove 58 as a single groove 52, the cold water seal groove 56, the inlet seal groove 57 and the hot water seal groove 58 can also be formed separately from one another in the base 22. Accordingly, the inlet seal elements 54' and the discharge seal element are also formed separately from one another.

As can be clearly seen particularly in FIGS. 2 and 4, the continuous water discharge groove 48 that is open on the outside in the radial direction is formed in the base 22 of the internal housing 12. In order to connect the channel section 46 of the discharge opening 40 extending in axial direction A to the water discharge groove 48, the discharge opening 40 has the connecting section 64 running at right angles to the axial direction A, with the channel section 46 running in the radial direction more or less midway between the wall 20 and its axis of symmetry. This connecting section 64 is bounded on the one hand radially outwards by a wall-like base segment 66 and on the other hand by a further base segment 67 through which the cold water opening 28 and the hot water opening 30 pass.

In order to deflect the water flowing through the discharge opening 40 from the axial direction A at least roughly by 90° from the channel section 46 into the connecting section 64, a deflection element 68 is formed in the connecting section 64 opposite the opening 65 of the channel section 46 into the connecting section 64 (see FIG. 4). This deflection element 68 protrudes in the form of a wedge from a channel base 70 of the connecting section 64 in the direction of the opening and is intended to deflect a water jet discharged from the opening 65 into the connecting section 64. For this purpose, this deflection element 68 has two deflection surfaces 72 that merge at a crest line 74 running in the radial direction. The crest line 74 runs centrally under the opening 65 so that the water jet discharged from the opening 65 strikes the crest line 74 in the middle. The deflection surfaces 72 have a concave curvature to deflect the water jet along these deflection surfaces 72 and merge continuously into the channel base 70, that in turn merges continuously into a side surface 76 of the water discharge groove 48 at the lower end. The design of the deflection element 68 with two deflection surfaces 72 allows this also to act as a jet splitter.

The deflection element 68 with the deflection surfaces continuously deflects the water directed into the connection section 64 from above, allowing swirling to be essentially prevented. Consequently a noise development caused by the occurrence of swirling can be essentially avoided.

With the arrangement of the connecting section 64 with respect to the water discharge groove 48 described above, the former opens into the groove at an obtuse angle in relation to the tangential direction of the water discharge groove 48 at two opposed discharge opening orifices 50. This again helps to essentially prevent swirling.

An upper seal receiving recess 80 is formed in a radially outer shell surface of the internal housing 12 in the region of the base 22, above the water discharge groove 48 and runs completely around the internal housing 12. A lower seal receiving recess 81 is formed in the outer shell surface in the region of the sleeve wall 24, slightly below the water discharge groove 48.

Inside the fitting discharge housing part 17 is the external housing discharge channel 42 that is intended to direct the water discharged from the water discharge groove 48 through the fitting discharge housing part 17 to the water discharge opening. To this end, the fitting discharge housing part 17 forms an annular channel 88 together with the water discharge groove 48, whereby a wall of the fitting discharge housing part 17 is thinner in the region of the annular channel 88 than above and below the annular channel 88. As a result, a flow cross section of the annular channel 88 can be increased so that the flow velocity in the annular channel 88 is decreased. A lower flow velocity in the annular channel results in less swirling and hence in a reduction in the noise caused by the water flowing through the channel.

Above and below the annular channel 88, a seal ring 89 with a V-shaped cross section is inserted into each of the upper seal receiving recess 80 and the lower seal receiving recess 81 that contacts and seals against the internal housing 12 and against the fitting discharge housing part 17. In order to press the seal rings 89 by means of the water pressure on the one hand radially inwards to seal against the internal housing 12 and on the other hand to seal against the fitting discharge housing part 17, the opening of each V-shaped seal ring faces towards the annular channel 88.

In order to hold the fitting discharge housing part 17 pivotably on the internal housing 12, an upper slide ring 100 and a lower slide ring 92 are arranged between the internal housing and the fitting discharge housing part 17.

The lower slide ring 92 is inserted into a slide ring retaining groove 94 formed on the sleeve wall 24, whereby it projects in the radial direction over the sleeve wall 24. The slide ring retaining groove 94 is formed by two collars 95 protruding from the sleeve wall 24. Alternatively the slide ring retaining groove 94 can be waived, in which case the lower slide ring is then pushed onto the correspondingly formed internal housing from below.

The upper slide ring 100 is placed onto the internal housing 12 from above before the cartridge retaining nut 23 is screwed onto the internal housing 12, and lies such that it bears radially inwards against the internal housing and radially outwards against the fitting discharge housing part 17.

In order to fix the fitting discharge housing part 17 in axial direction A relative to the internal housing 12, the latter has a ring-like projection 96 extending inwards directly above the region in which the lower slide ring 92 contacts the fitting discharge housing part 17. The fitting discharge housing part 17 rests with this projection on the lower slide ring 92. This in turn lies on an external housing base 97 that is fixed relative to the internal housing 12. The fitting discharge housing part 17 also has a retaining ring 98 protruding radially inwards with an exposed stop surface facing upwards. The retaining ring 98 is intended to interact with the cartridge retaining nut 23 located above the retaining ring 98 via the upper slide ring 100 and an O-ring 102 in order to hold the fitting discharge housing part 17 in axial direction A. The O-ring 102 is intended to prevent the ingress of dirt into the sanitary fitting 10.

In order to limit the slewing range of the fitting discharge housing part 17, a radially protruding projection 104 is formed on the sleeve wall 24 of the internal housing 12 which projection is arranged in axial direction A between the lower seal receiving recess 81 and the slide ring retaining groove 94. This projection 104 has two stop surfaces 106 opposed in circumferential direction that interact with the opposite stop surfaces on the fitting discharge housing part 17. The opposite stop surfaces limit an inwardly open recess in the fitting discharge housing part 17.

As can be seen in FIG. 2, the sleeve wall 24 of the internal housing 12 has a radial, round opening 110 that is intended to allow the passage of mechanical parts of a generally known drain valve actuating mechanism of the wash basin. This drain valve actuating mechanism also passes in the known manner through the outer housing base 97 arranged in axial direction A between the wash basin and the fitting discharge housing part 17, said outer housing base being fixed in relation to the internal housing 12.

In order to move an interacting pair of ceramic discs of the control cartridge 16 relative to one another in the known manner, thereby allowing the water flow rate and the mixing ratio of hot and cold water to be regulated, one of the ceramic discs has an active link to an actuating shaft of the control cartridge. The housing of the sanitary fitting 10 has a handle linked to the actuating shaft. The housing of the sanitary fitting 10 furthermore has a domed cap 120 through which the actuating shaft and handle pass and which surrounds the internal housing 12 with the inserted control cartridge 16. The domed cap 120 is at least roughly in contact with the fitting discharge housing part 17 and forms together with the latter and the outer housing base 97 the outer housing of the sanitary fitting 10.

A guide ring 90 is held on the cartridge retaining nut 23 by snapping. To this end, the cartridge retaining nut 23 has a continuous recess in its radial outer shell surface into which an annular thick section of the guide ring 90 engages. The guide ring 90 serves to guide the domed cap 120 radially. The guide ring 90 serves furthermore to ensure rough sealing so that no dirt can enter the sanitary fitting through the gap between the fitting discharge housing part 17 and the domed cap 120. To this end, the guide ring 90 has a continuous collar projecting radially outwards that in axial direction A rests on the one hand against an upper end face of the fitting discharge housing part 17 and on the other hand against a lower end face of the domed cap 120.

In a further embodiment of the sanitary fitting according to the invention with a spray head hose that can be extended in the known manner, the discharge opening passes in correspondence with the cold water opening and the hot water opening in the axial direction through the base and has a thread in an end region facing away from the receiving opening. This thread interacts with a spray head hose thread of a spray head hose that in its end region opposite the spray head hose thread has a spray head forming the water discharge opening. In order to guide the spray head hose in the radial direction out of the internal housing, the housing has in the region of the sleeve wall a spray head hose opening through which the spray head is guided into a spray head hose retaining arm mounted pivotably on the internal housing. This spray head hose retaining arm is held on the internal housing by analogy with the fitting discharge housing section of the first embodiment. Between the discharge opening and the spray head hose opening, the spray head hose runs in a loop in the normal manner.

The internal housing 12 is made of a high-strength plastic so that the control cartridge 16 can be held firmly in the internal housing 12 by means of the cartridge retaining nut 23, as a result of which the seal element 54 is also held firmly in the groove 52 formed in the base 22 and in the control cartridge groove 62. The internal housing is preferably made of the plastic with the trade name Grivory HT1V-4FWA from the Ems-Chemie AG (GRIVORY is a registered trade mark of the EMS-CHEMIE AG, Domat/Ems, Switzerland).

In a further embodiment, a control cartridge with only one inlet orifice can also be employed. Such a control cartridge can consequently control only the water flow rate. The additional inlet opening—for example, the hot water opening—can consequently be waived in an internal housing for such a control cartridge.

What is claimed is:

1. An internal housing for a sanitary fitting, the internal housing comprising:
   a receiving opening open on an upper side for receiving a control cartridge comprising an inlet orifice and a discharge orifice, the receiving opening being bounded along a circumference by a wall, and
   a discharge opening for discharging water from the discharge orifice,
   wherein:
   the receiving opening is bounded at a lower end by a base formed in one piece with the wall, with an inlet opening for supplying water to the inlet orifice, the discharge opening, an inlet seal groove open on an upper side for receiving an inlet seal element and completely surrounding the inlet opening, and a discharge seal groove open on an upper side for receiving a discharge seal element and completely surrounding the discharge opening being formed in the base,
   the inlet opening and the discharge opening are for guiding water and the discharge opening opens into a water discharge groove open around a circumference and formed in the base, and the discharge opening has a channel section extending downwards away from the receiving opening and opening at least roughly in the middle of a connecting section arranged at least roughly at right angles to the channel section, and a deflection element is formed in the connecting section, in the extension of the channel section, on a channel base of the connecting section for continuously deflecting the water flowing from the control cartridge by at least roughly 90 degrees, with a deflection surface of the deflection element continuously merging into a surface of the channel base.

2. The internal housing as claimed in claim 1, wherein the internal housing is made of plastic.

3. The internal housing as claimed in claim 1, wherein the inlet seal groove is arranged at a distance from the inlet opening and the discharge seal groove is arranged at a distance from the discharge opening.

4. The internal housing as claimed in claim 1, wherein the inlet seal groove is formed contiguously with the discharge seal groove.

5. The internal housing as claimed in claim 1, wherein a thread is formed on the base in an end region of the inlet opening facing away from the receiving opening for interacting with a mating thread located on water supply line.

6. The internal housing as claimed in claim 1, wherein each of a continuous upper seal receiving recess above the water discharge groove and a continuous lower seal receiving recess below the water discharge groove are formed on the internal housing for receiving one seal element.

7. The internal housing as claimed in claim 1, wherein the deflection surface has a concave form.

8. The internal housing as claimed in claim 1, further comprising an outer surface having an at least roughly circular cylindrical form, and a projection extending radially from the outer surface and having stop surfaces oriented in a circumferential direction for interacting with opposite stop surfaces on a fitting discharge housing part pivotably engaging around the internal housing.

9. A sanitary fitting comprising:
an external housing, and
an internal housing inserted in the external housing, the internal housing comprising:
a receiving opening open on an upper side for receiving a control cartridge comprising an inlet orifice and a discharge orifice, the receiving opening being bounded along a circumference by a wall, and
a discharge opening for discharging water from the discharge orifice, wherein:
the receiving opening is bounded at a lower end by a base formed in one piece with the wall, with an inlet opening for supplying water to the inlet orifice, the discharge opening, an inlet seal groove open on an upper side for receiving an inlet seal element and completely surrounding the inlet opening, and a discharge seal groove open on an upper side for receiving a discharge seal element and completely surrounding the discharge opening being formed in the base, the control cartridge is inserted into the receiving opening, the inlet seal element and the discharge seal element respectively engage in the inlet seal groove and in the discharge seal groove and the external housing has a water discharge channel that has a flow connection to the discharge opening, and the control cartridge has a control cartridge groove for holding the inlet seal element and the discharge seal element.

10. The sanitary fitting as claimed in claim 9, wherein a fitting discharge housing part of the external housing is supported pivotably about a pivot axis extending in an axial direction on the internal housing, wherein the bearing of the fitting discharge housing part on the internal housing is formed by a lower slide ring and an upper slide ring that bear against the fitting discharge housing part in opposite end regions in an axial direction and are held on the internal housing.

11. The sanitary fitting as claimed in claim 10, the internal housing further comprising an outer surface having an at least roughly circular cylindrical form, and a projection extending radially from the outer surface and having stop surfaces oriented in the circumferential direction for interacting with opposite stop surfaces on a fitting discharge housing part pivotably engaging around the internal housing, wherein a pivot limit is formed by the stop surfaces formed on the internal housing and the opposite stop surfaces arranged on the fitting discharge housing part.

12. The sanitary fitting as claimed in claim 9, wherein the internal housing is made of plastic.

13. The sanitary fitting as claimed in claim 12, wherein the inlet seal groove is formed contiguously with the discharge seal grove.

\* \* \* \* \*